United States Patent
Darwhekar et al.

(10) Patent No.: US 10,924,309 B2
(45) Date of Patent: Feb. 16, 2021

(54) PHASE ERROR REDUCTION IN A RECEIVER

(71) Applicant: TEXAS INSTRUMENTS INCORPORATED, Dallas, TX (US)

(72) Inventors: Yogesh Darwhekar, Bengaluru (IN); Pranav Kumar, Hatia (IN); Arpan Thakkar, Vadodara (IN); Naveen Mahadev, Bengaluru (IN); Srikanth Manian, Chennai (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/793,486

(22) Filed: Feb. 18, 2020

(65) Prior Publication Data

US 2020/0186403 A1 Jun. 11, 2020

Related U.S. Application Data

(63) Continuation of application No. 16/130,087, filed on Sep. 13, 2018, now Pat. No. 10,608,853.

(51) Int. Cl.
*H04L 27/00* (2006.01)
*H04L 27/38* (2006.01)
*H04L 27/152* (2006.01)
*H04L 27/148* (2006.01)

(52) U.S. Cl.
CPC ........ *H04L 27/0014* (2013.01); *H04L 27/148* (2013.01); *H04L 27/1525* (2013.01); *H04L 27/3863* (2013.01); *H04L 2027/0016* (2013.01); *H04L 2027/0024* (2013.01)

(58) Field of Classification Search
CPC ............... H04L 27/0014; H04L 27/148; H04L 27/3863; H04L 27/1525; H04L 2027/0016; H04L 2027/0024
USPC ........................................................ 375/332
See application file for complete search history.

(56) References Cited

U.S. PATENT DOCUMENTS

| | | | |
|---|---|---|---|
| 4,696,017 A | 9/1987 | Masheff et al. | |
| 6,456,167 B1 | 9/2002 | Huang | |
| 6,831,497 B2 | 12/2004 | Koh et al. | |
| 7,002,403 B2 | 2/2006 | Marholev | |
| 7,620,373 B2 | 11/2009 | Cole et al. | |
| 8,233,524 B2 | 7/2012 | Thirumoorthy | |
| 8,503,576 B2 | 8/2013 | Mehrmanesh et al. | |
| 8,615,205 B2 * | 12/2013 | Choksi ................... | H03D 3/009 455/115.1 |

(Continued)

OTHER PUBLICATIONS

International Search Report in corresponding PCT Application No. PCT/US2019/050385, dated Dec. 26, 2019 (2 pages).

*Primary Examiner* — Juan A Torres
(74) *Attorney, Agent, or Firm* — Valerie M. Davis; Charles A. Brill; Frank D. Cimino

(57) ABSTRACT

A receiver circuit includes a quadrature signal generator to generate an in-phase (I) signal and a quadrature (Q) signal from a local oscillator signal and an IQ phase sense and control circuit to generate a phase adjustment code responsive to a phase error between quadrature signals generated by a plurality of mixers. The receiver circuit also includes a phase corrector to adjust a phase difference between the I and Q signals from the quadrature signal generator to generate corrected I and Q signals to be provided to the plurality of mixers.

20 Claims, 5 Drawing Sheets

(56) References Cited

U.S. PATENT DOCUMENTS

| | | | |
|---|---|---|---|
| 8,854,098 B2* | 10/2014 | Yang | ............... H03L 7/0812 |
| | | | 327/233 |
| 9,444,560 B1 | 9/2016 | Goh | |
| 2003/0053563 A1 | 3/2003 | Mohindra | |
| 2003/0165203 A1 | 9/2003 | Mohindra | |
| 2006/0009180 A1 | 1/2006 | Xu et al. | |
| 2009/0028231 A1 | 1/2009 | Lee et al. | |
| 2012/0263215 A1 | 10/2012 | Peng | |
| 2014/0270002 A1 | 9/2014 | Schubert et al. | |
| 2016/0359614 A1 | 12/2016 | Hao et al. | |
| 2017/0005855 A1 | 1/2017 | Tsatsanis et al. | |

\* cited by examiner

PHASE ERROR REDUCTION IN A RECEIVER

CROSS-REFERENCE TO RELATED APPLICATION(S)

This continuation application claims priority to U.S. patent application Ser. No. 16/130,087, filed Sep. 13, 2018, and is incorporated herein by reference in its entirety.

BACKGROUND

Some types of communication modulation techniques involve the use of an in-phase (I) signal and a quadrature (Q) signal. The phase difference between the I and Q signals should be of a predetermined level (e.g., 90 degrees). Unfortunately, the phase difference between the I and Q signals in a receiver may deviate from the predetermined level, which is referred to as phase error. Phase error can limit the image response rejection ratio (IMRR).

SUMMARY

In one example, a receiver circuit includes a quadrature signal generator to generate an in-phase (I) signal and a quadrature (Q) signal from a local oscillator signal and an IQ phase sense and control circuit to generate a phase adjustment code responsive to a phase error between quadrature signals generated by a plurality of mixers. The receiver circuit also includes a phase corrector to adjust a phase difference between the I and Q signals from the quadrature signal generator to generate corrected I and Q signals to be provided to the plurality of mixers.

BRIEF DESCRIPTION OF THE DRAWINGS

For a detailed description of various examples, reference will now be made to the accompanying drawings in which.

DETAILED DESCRIPTION

The described examples pertain to receivers that perform demodulation using in-phase (I) and quadrature phase (Q) signals. Examples of such modulation/demodulation techniques include quadrature amplitude modulation (QAM) and quadrature phase shift keying (QPSK). The phase difference between a receiver's I and Q signals should nominally be a predetermined value (e.g., 90 degrees). Any deviation from the predetermined phase difference is a phase error. The receiver described herein implements a calibration mode that permits the phase error between the locally-generally I and Q signals to be dynamically adjusted and reduced.

Figure 1:
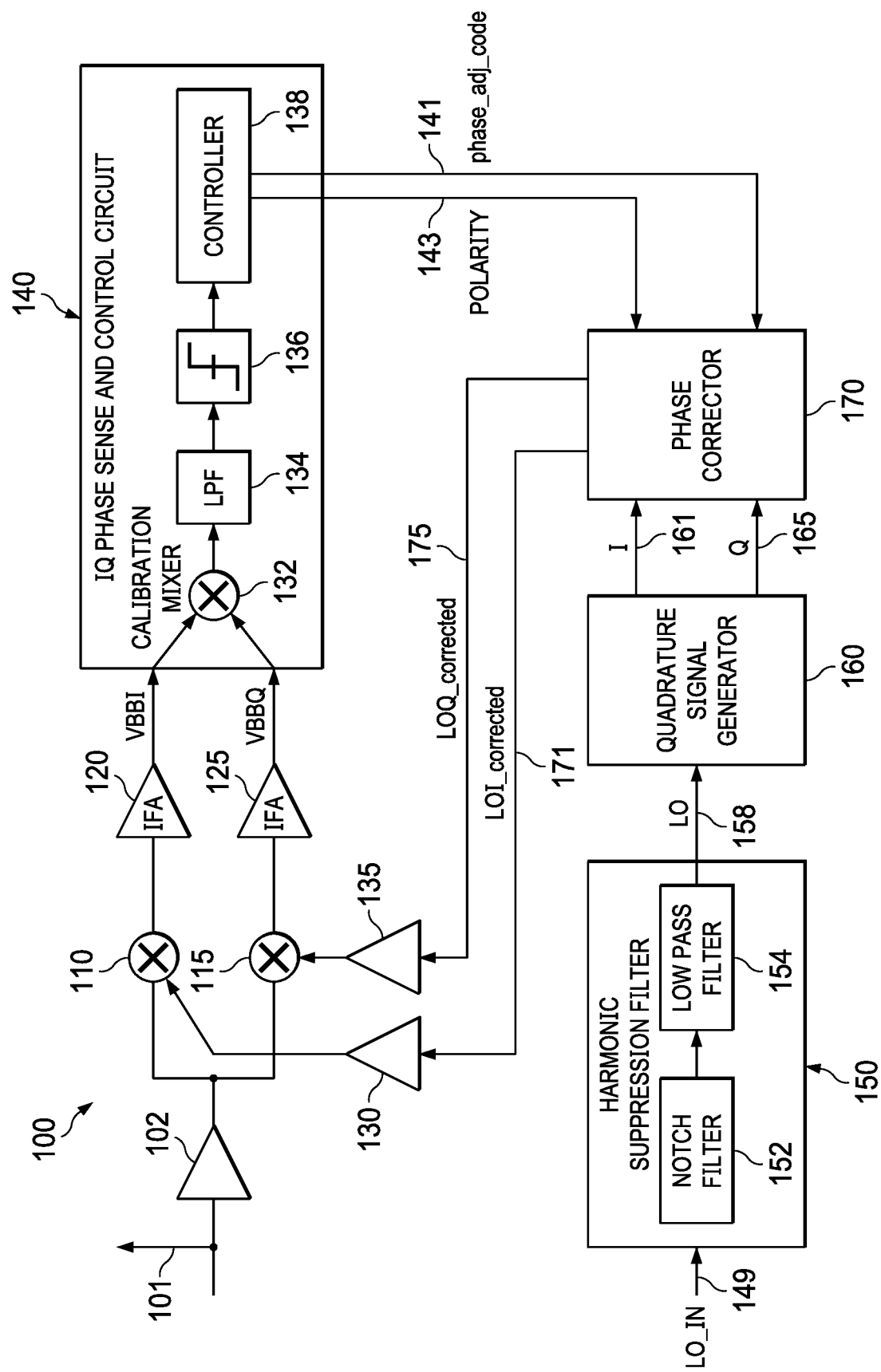
FIG. 1 illustrates an example of a receiver circuit that calibrates its locally-generated in-phase (I) and quadrature (Q) signals to reduce the phase error.

FIG. 1 illustrates an example of a receiver circuit 100. The example receiver circuit 100 of FIG. 1 includes an amplifier 102, mixers 110 and 115, intermediate frequency amplifiers (IFA) 120, 125, buffers 130, 135, an IQ phase sense and control circuit 140, a harmonic suppression filter 150, a quadrature signal generator 160, and a phase corrector 170. Amplifier 102 amplifies an input signal and provides its amplified output to mixer 110 and to mixer 115. Mixers 110 and 115 mix the amplified output from amplifier 102 with respective local oscillator quadrature I and Q signals represented in FIG. 1 as LOI_corrected 171 and LOI_corrected 175. The outputs from mixers 110 and 115 include baseband signals. The output from mixer 110 is amplified by IFA 120, and the output from mixer 115 is amplified by IFA 125.

The output from IFA 120 is shown as VBBI and the output from IFA 125 is shown as VBBQ. The IQ phase sense and control circuit includes a calibration mixer 132, a low pass filter 134, a zero crossing detector 136 and a controller 138. VBBI and VBBQ are mixed together by calibration mixer 132, the output of which is filtered by low pass filter 134. The zero crossing detector 136 receives the filtered output from the low pass filter 134 and generates an output signal to the controller 138 that is indicative of whether the low pass filter's output is positive or negative, in proportion to the phase difference between the I and Q paths.

The harmonic suppression filter 150 receives a local oscillator input signal (LO_IN) 149. The frequency of LO_IN 149 may be the same as the frequency of the LOI_corrected 171 and LOQ_corrected 175 signals used with mixers 110 and 115. Further, the LO_IN 149 may be sinusoidal or a square wave. In this example, the harmonic suppression filter 150 includes a notch filter 152 and a low pass filter 154. In this example, the center frequency of the notch in the frequency response of the notch filter 152 is set coincident with the third harmonic of the LO_IN 149. The low pass filter 154 then passes through the fundamental frequency of the LO_IN 149 as LO 158 to the quadrature signal generator 160.

Figure 2:
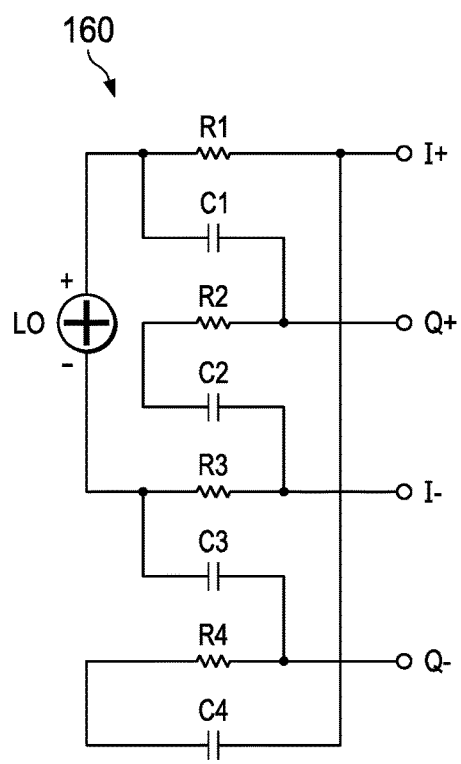
FIG. 2 illustrates an example of a quadrature signal generator usable in the receiver circuit of FIG. 1.

The quadrature signal generator 160 produces I and Q signals 161 and 165 from the LO 158. Referring briefly to FIG. 2, an example implementation of the quadrature signal generator 160 is shown as a single stage of a polyphase filter. In other examples, the polyphaser filter is implemented as multiple stages. The single stage polyphaser filter of FIG. 2 includes resistors R1, R2, R3, and R4 and capacitors C1, C2, C3, and C4. The LO positive node is provided to one terminal of R1, which also connects to C1. C1 connects to R2. R2 connects to C2. R3 connects to C3. C3 connects to R4, and R4 connects to C4. C4 then connects back to R1 as shown. Each resistor and capacitor pair generates an I or Q output as shown. The I output is shown as I+ and I−. I+ is provided by R1 and I− is provided by R3. The Q output is shown as Q+ and Q−. Q+ is provided by R2 and Q− is provided by R4. Q+ is nominally 90 degrees out of phase with respect to I+, and the phase corrector 170 (FIG. 1) ensures that the phase error is reduced to less than a predetermined level (i.e., that the phase difference is within a small predetermined value of 90 degrees).

Referring back to FIG. 1, calibration mixer 132 multiplies the baseband signals VBBI and VBBQ. The resulting multiplication results in a direct current (DC) component and a component at a frequency of twice the intermediate frequency. Selection of the intermediate frequency is such that the intermediate frequency falls within the passband of the IFAs 120, 125. The DC component is proportional to the sine of the phase error. If the phase error is 0, the DC component is 0. A positive DC component indicates a positive phase error and a negative DC component indicates a negative phase error. The low pass filter 134 attenuates the frequency components other than the DC component. The zero crossing detector 136 generates an output signal that indicates the polarity of the phase error. The controller 138 responds to the signal from the zero crossing detector 136 to generate a polarity signal 143 (explained below) and a phase_adj_code 141 to cause the phase corrector 170 adjust the phase difference between I 161 and Q 165 to cause the phase error between I and Q to be reduced. The I and Q output of the phase corrector 170 is the LOI_corrected signal 171 and the LOQ_corrected signal 175, respectively, which are then provided through buffers 130 and 135 to mixers 110 and 115. Any phase error between I 161 and Q 165 is reduced incrementally by the interaction of the IQ phase sense and control circuit 140 submitting phase_adj_codes 141 to the phase corrector 170.

The receiver 100 advantageously balances out the quadrature phase error otherwise introduced by the local oscillator (that generates LO_IN 149) and mixers 110 and 115. As the phase error detection is performed in the baseband, the disclosed examples are relatively independent of the operational frequency of the receiver, and therefore can correct for imperfections at higher frequencies. Further, the receiver 100 detects the phase mismatch at the baseband frequency and can operate using a local oscillator signal LO_IN 149 that is either sinusoidal or a square wave.

During the calibration process of the receiver, the input signal to amplifier 102 is a single tone (single frequency) 101 to be used to calibrate the phase error of the receiver 100. A calibration process is performed to reduce the phase error. The calibration process may performed at any suitable point in time such as when the frequency of the local oscillator is to be changed, when a change in an environmental condition is detected (e.g., ambient temperature has changed more than a predetermined amount), etc. In one example, the frequency of the single tone 101 is within a range of frequencies that are different than the frequency of LOI_corrected 171 and LOQ_corrected 175.

Figure 3:
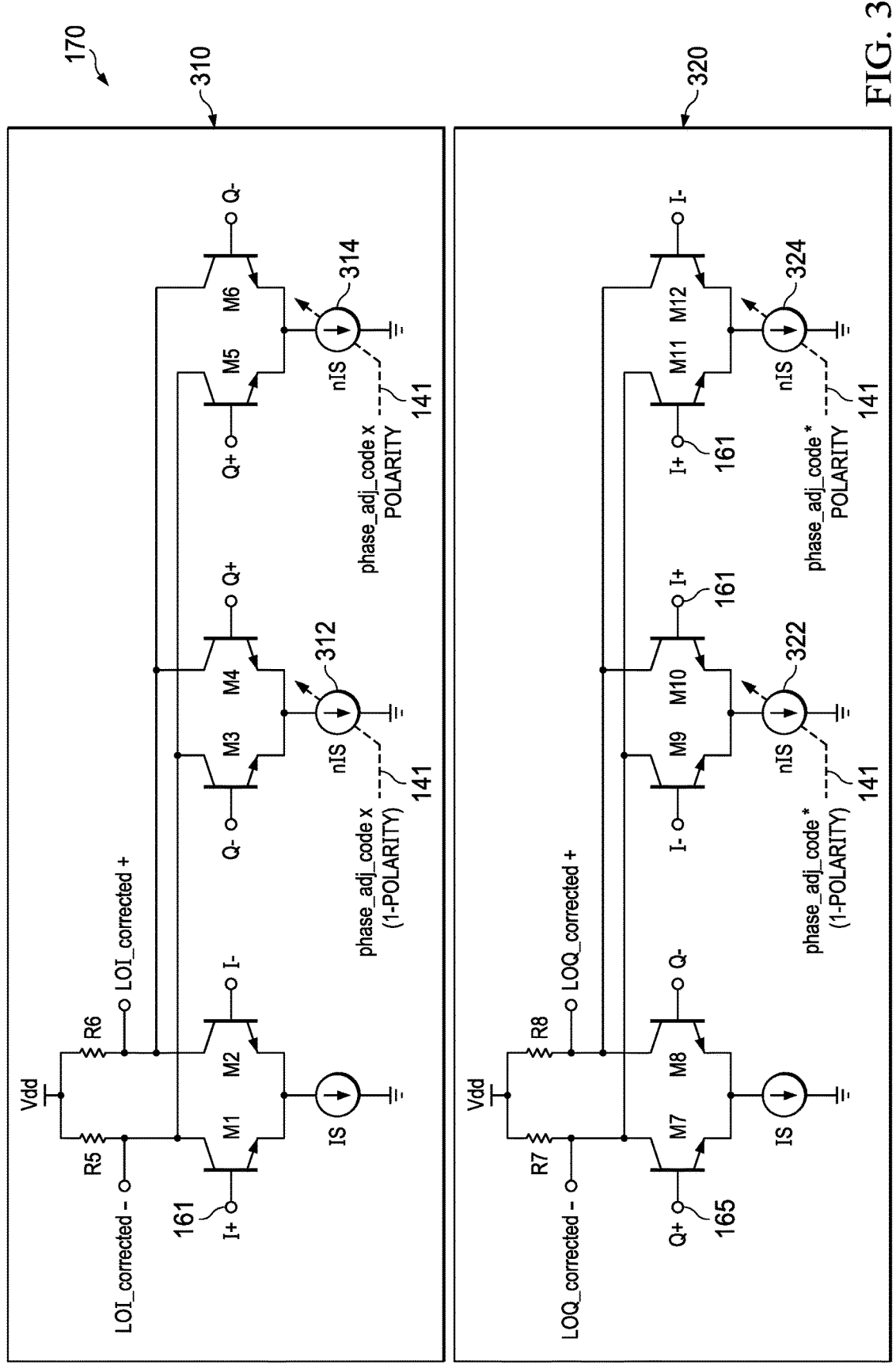
FIG. 3 illustrates a phase corrector usable in the receiver circuit of FIG. 1.

FIG. 3 provides an example implementation of phase corrector 170. In this example, the phase corrector 170 includes a circuit to adjust the phase error between I and Q. Circuit 310 adjusts the phase of I and circuit 320 adjust the phase of Q. In this example, the phase of each of I and Q are adjusted so as to reduce the phase error between I and Q. Other examples can be implemented to adjust just the phase of I, or just the phase of Q, without adjusting the phases of both I and Q.

The transistors shown in the example of FIG. 3 comprise bipolar junction transistors (BJTs) and specifically n-type BJTs, but in other examples, the transistors can be implemented as p-type BJTs, metal oxide semiconductor field effect transistors (MOSFETs), or other types of transistors. Circuit 310 includes a transistors M1 and M2. M1 connects to a resistor R5 and M2 connects to a resistor R6. Thus, each of the transistors is coupled to a separate resistor. R5 and R6 are coupled to a power supply node (Vdd). M1 and M2 are also coupled to a current source (IS), which may be implemented as a transistor biased to operate in the saturation region. The gate of M1 is driven by I+ 161 and the gate of M2 is driven by the inverse of I (I−) which are shown in FIG. 2.

In the example of FIG. 3, circuit 310 also includes two other pairs of transistors—M3 and M4 as well as M5 and M6. Transistors M3 and M4 are coupled to a dynamically adjustable current source 312 whose current magnitude is designated as nIS, where "n" is an adjustable value based on the phase_adj_code 141. Similarly, transistors M5 and M6 are coupled to a dynamically adjustable current source 314 also controlled by phase_adj_code 141. The phase_adj_code 141 controls the magnitude of the current through either nIS. In this example, only one of the current sources 312 and 314 is turned on by the phase_adj_code 141 based on whether the phase error is positive or negative (i.e., based on the polarity of the phase error) as encoded by polarity signal 143 in FIG. 1. The selection of the current source 312 or 314 is indicated by the reference to the polarity signal 143 for current source 314 and the reference to (1-polarity) for current source 312. Circuit 320 is similar to circuit 310. Circuit 320 also includes two other pairs of transistors M9 and M10 as well as M11 and M12. Transistor pairs M9/M10 and M11/M12 are coupled to respective dynamically adjustable current sources 322 and 324 also designated as nIS, where "n" is an adjustable value based on the phase_adj_code 141. As above, only one of the current sources 322 and 324 is turned on and controlled by the phase_ adj_code 141 based on whether the phase error is positive or negative (i.e., based on the polarity of the phase error) as encoded by polarity signal 143 in FIG. 1.

In the example of FIG. 3, for a positive phase error (e.g., 91 degrees instead of the nominal 90 degrees for a +1 degree phase error), the corresponding edges of I and Q should be adjustable to be closer together. Thus, an edge of I 161 should be advanced towards the corresponding edge of Q 165, and the edge of Q 165 should be delayed towards the edge of I. The timing of each of the edges of I and Q are controlled by the transistor pairs M3/M4, M5/M6, M9/M10, and M11/M12. To reduce a positive phase error, the adjustable current source 314 is activated (but not current source 312) to cause current in excess of IS to flow through resistor R6 when Q 165 is high. The polarity signal 143 (FIG. 1) is used to turn on one or the other of the current sources 312, 314. Similarly, when Q 165 is high, which turns on M5, current in excess of IS flows through R5. The differential voltage LOI_corrected+−LOI_corrected− is thereby adjusted to be lower compared to what would have been the case without activating current source 314. With the differential voltage LOI_corrected+−LOI_corrected− reduced, the differential voltage crosses the zero voltage level at an earlier point in time than would have been the case without application of the phase_adj_code 141 to the current source 314. The opposite effect is created in the circuit 320 to delay the edge of Q 165 towards I 161 to reduce a positive phase error. Current source 324 is turned (based on polarity signal 143) on when I 161 is high thereby causing the differential voltage LOQ_corrected+−LOQ_corrected− to be increased (compared to what would have been the voltage in the absence of the activation of current source 324). As such, the differential voltage LOQ_corrected+−LOQ_corrected− crosses the zero voltage level later when Q 165 changes state thereby delaying the edges of Q.

Figure 4A:
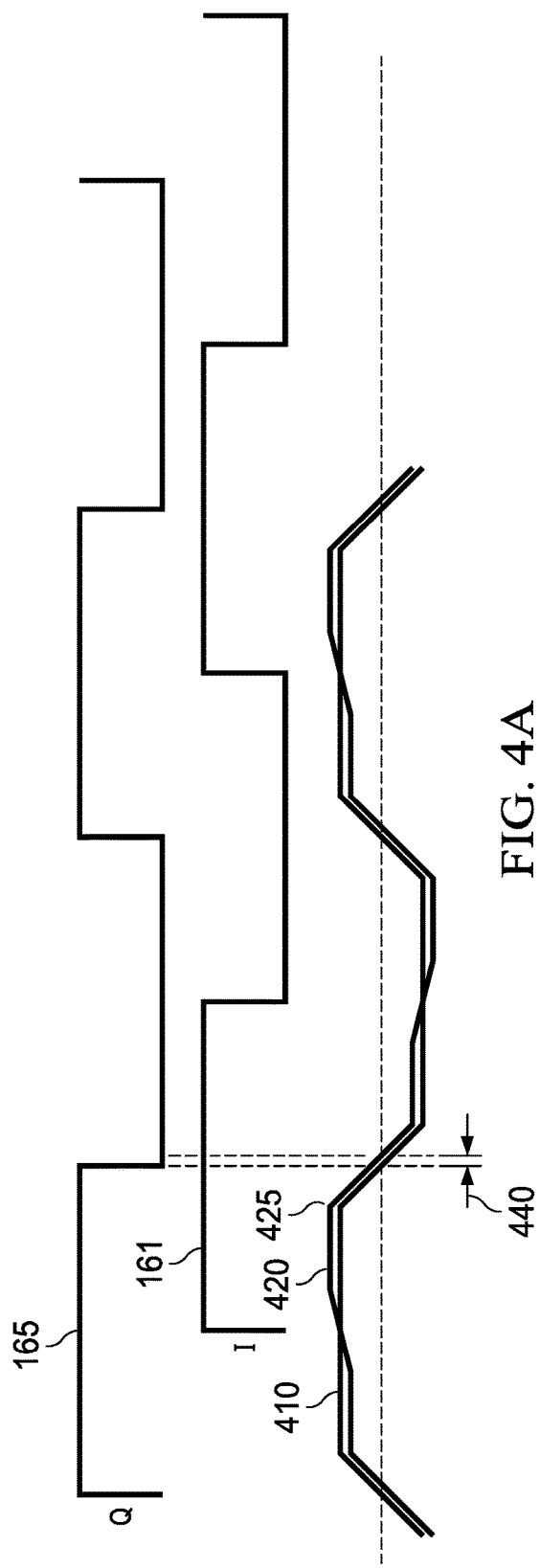
FIGS. 4A and 4B illustrate waveforms of the operation of the phase corrector of FIG. 3 in accordance with an example
Figure 4B:
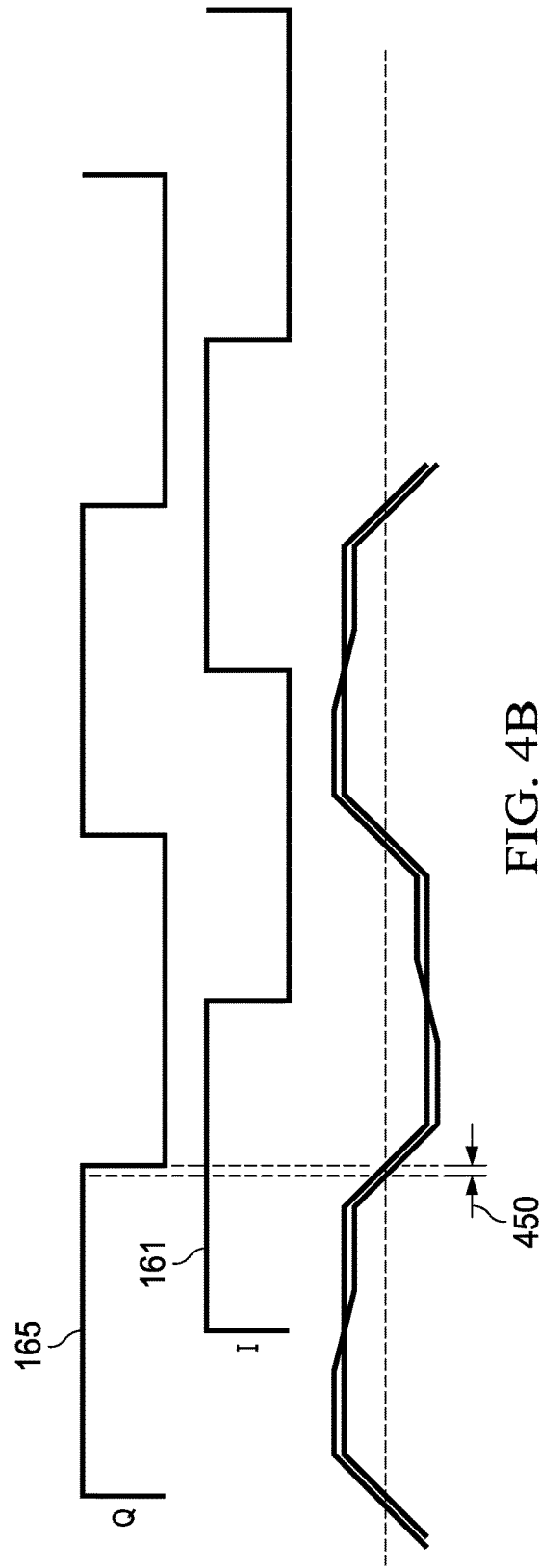

FIG. 4A shows an example timing diagram illustrating the delay of the edge of Q 165 with respect to the corresponding edge of I. FIG. 4B shows an example timing diagram illustrating the advancement of the edge of Q 165 with respect to the corresponding edge of I. Each timing diagram illustrates Q 165 and I 161. Waveform 410 represents the differential voltage LOQ_corrected+−LOQ_corrected− with no correction from application of the phase_adj_code 141. Waveform 420 represents the resulting differential current LOQ_corrected+−LOQ_corrected−. As the differential current is higher at 425 when Q transitions to a low value, the resulting differential voltage transitions crosses the zero level at a later point in time than for waveform 410 as illustrated at 440. FIG. 4B illustrates the same concept but for the advancement of the I 161 edges relative to Q 165 as illustrated at 450.

The controller 138 generates the polarity signal 143 based on whether the zero-crossing detector 136 indicates that the phase error is positive or negative and also generates the phase_adj_code 141 to cause the phase corrector 170 to adjust the timing of the I and Q edges. The controller 138 may implement a binary search technique which iteratively changes the most significant bit of the code to converge relatively quickly. Alternatively, the controller 138 can implement a thermometric technique which increments or decrements the code one step at a time to converge smoothly. For any type of technique, in some examples the controller 138 stops when either the code value reaches a predetermined threshold or toggles between two codes for a predetermined number of cycles.

Figure 5:
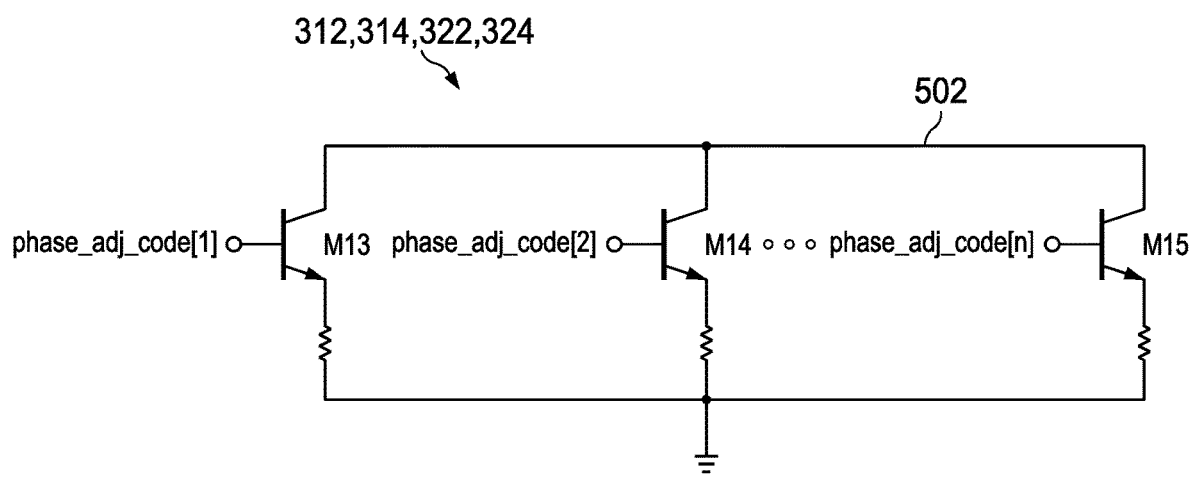
FIG. 5 illustrates a dynamically adjustable current source circuit usable in the phase corrector of FIG. 3.

FIG. 5 shows an example implementation of any of the adjustable current sources 312, 314, 322, and 324. In this example, the adjustable current source includes multiple transistors (e.g., n-type BJTs) M13, M14, ..., M15 (three transistors in this example, but other than three in other examples), each coupled to a resistor. The collectors of M13-M15 are connected together at node 502. Node 502 represents the node that connects to the emitters of the corresponding transistor pairs in FIG. 3. Each transistor M13-M15 is selectively turned on and off in proportion to the phase_adj_code 141 (e.g., phase_adj_code[1] controls the base of M13, phase_adj_code[2] controls the base of M14 and phase_adj_code[n] controls the base of M15). By turning on select transistors, the amount of current through the current source can be controlled. A larger magnitude of the current through a given current source 312, 314, 322, 324 will cause a larger change in the edges of I 161 and Q 165 as described above, and a smaller current source magnitude will create a smaller change in the edges of I and Q.

Figure 6:
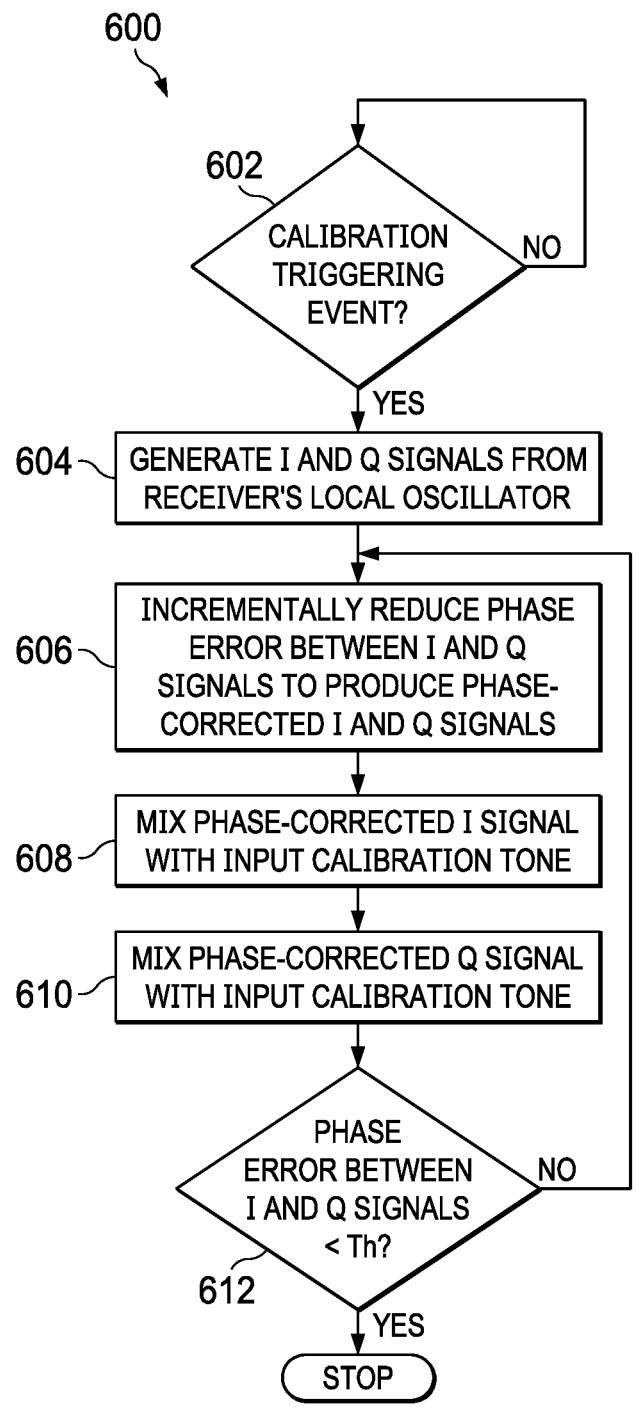
FIG. 6 illustrates a calibration method to reduce phase error in accordance with an example.

FIG. 6 is a flow chart illustrating a calibration method 600 in accordance with an example. The operations may be performed in the order shown, or in a different order. Further, two or more of the operations may be performed concurrent instead of sequentially.

At 602, the method includes detecting the occurrence of a calibration triggering event. In one example, the calibration triggering event may be detected based on a change to an environmental condition such as a temperature reading from a temperature sensor deviating more than a predetermined amount. Another example of a triggering event is a change in the frequency of the local oscillation signal LO_IN 149 to be used by the receiver 100. A signal can be asserted to manually start the calibration process. During the calibration process, a single tone input 101 is transmitted to the receiver 100 as explained above.

If a calibration triggering event is detected, then at 604, the method includes generating I 161 and Q 165 signals from the receiver's local oscillator (which generates LO_IN 149). FIG. 2 provides one example of how I and Q signals can be generated using a single stage polyphaser filter circuit.

At 606, the method includes incrementally reducing any phase error between the I and Q signals to produce phase-corrected I and Q signals (referred to herein as LOI_corrected 171 and LOQ_corrected 175). The example phase corrector 170 is described above to show how the phase error can be reduced.

At 608, the method includes mixing the phase-corrected I signal (LOI_corrected 171) with the input calibration tone 101 and at 610, the phase-corrected Q signal (LOQ_corrected 175) also is mixed with the input calibration tone 101.

At 612, the method includes determining whether a phase error remains. If there is still a phase error (e.g., in excess of a predetermined threshold), then control loops back to 606 to further incrementally reduce the phase error. The calibration process ends in some examples responsive to the output code toggling between two values for a predetermined number of cycles or when the output code reaches a predetermined threshold value.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A circuit comprising:
   a notch filter;
   a low pass filter coupled to the notch filter;
   a quadrature signal generator coupled to the low pass filter; and
   a phase corrector configured to receive, from the quadrature signal generator, in-phase (I) and quadrature (Q) signals derived from a local oscillator signal, receive a phase adjustment signal and a polarity signal, and adjust a phase difference between the I and Q signals using the phase adjustment and polarity signals to generate corrected I and Q signals.

2. The circuit of claim 1, wherein the quadrature signal generator comprises a polyphase filter.

3. The circuit of claim 1, further comprising an IQ phase sense and control circuit coupled to the phase corrector, wherein the IQ phase sense and control circuit includes:
   a mixer;
   a zero detect circuit configured to receive a direct current (DC) component from the mixer and responsively generate a signal that indicates a polarity of a phase error between I and Q baseband signals received by the mixer; and
   a controller configured to generate the phase adjustment and polarity signals using the signal from the zero detect circuit.

4. The circuit of claim 1, wherein:
   the phase corrector includes a multi-transistor current source; and
   the phase adjustment signal comprises a multibit digital value, where each bit controls a corresponding transistor within the multi-transistor current source.

5. The circuit of claim 1, wherein the notch filter has a center frequency that is coincident with a harmonic of the local oscillator signal.

6. The circuit of claim 1, wherein the low pass filter is configured to pass a fundamental frequency of the local oscillator signal.

7. The circuit of claim 1, wherein the phase corrector is configured to generate the corrected I and Q signals to have a same frequency as a frequency of the local oscillator signal.

8. The circuit of claim 1, wherein the phase corrector includes:
a correction circuit including:
a first plurality of transistors;
a plurality resistors coupled to the first plurality of transistors; and
a first current source device coupled to the first plurality of transistors; and
a current adjustment circuit including:
a second plurality of transistors coupled to the first plurality of transistors; and
a second current source device coupled to the second plurality of transistors;
wherein the current adjustment circuit is configured to generate a current by the second current source device responsive the polarity signal and adjust a magnitude of the current responsive to the phase adjustment signal to cause the correction circuit to generate the corrected I and Q signals.

9. The circuit of claim 2, wherein the polyphase filter is a single stage polyphase filter.

10. The circuit of claim 3, wherein the IQ phase sense and control circuit further includes a low pass filter coupled between the mixer and the zero detect circuit.

11. A circuit, comprising:
a filter circuit configured to suppress at least one harmonic of a local oscillator signal;
a polyphase filter coupled to the filter circuit; and
a phase corrector configured to receive, from the polyphase filter, in-phase (I) and quadrature (Q) signals derived from the local oscillator signal and adjust a phase difference between the I and Q signals to generate phase-corrected I and Q signals.

12. The circuit of claim 11, wherein the filter circuit includes:
a notch filter; and
a low pass filter coupled between the notch filter and the polyphase filter.

13. The circuit of claim 11, wherein the polyphase filter is a single stage polyphaser filter.

14. The circuit of claim 11, further comprising an IQ phase sense and control circuit including:
a mixer;
a zero detect circuit configured to receive a direct current (DC) component from the mixer and responsively generate a signal that indicates a polarity of a phase error between I and Q baseband signals received by the mixer; and
a controller configured to generate a phase adjustment signal and a polarity signal using the signal from the zero detect circuit and provide the phase adjustment and polarity signals to the phase corrector to generate the corrected I and Q signals.

15. The circuit of claim 12, wherein the notch filter has a center frequency that is coincident with a harmonic of the local oscillator signal, and the low pass filter is configured to pass a fundamental frequency of the local oscillator signal.

16. The circuit of claim 14, wherein the phase corrector includes:
a correction circuit including:
a first plurality of transistors;
a plurality resistors coupled to the first plurality of transistors; and
a first current source device coupled to the first plurality of transistors; and
a current adjustment circuit including:
a second plurality of transistors coupled to the first plurality of transistors; and
a second current source device coupled to the second plurality of transistors;
wherein the current adjustment circuit is configured to generate a current by the second current source device responsive the polarity signal and adjust a magnitude of the current responsive to the phase adjustment signal to cause the correction circuit to generate the corrected I and Q signals.

17. The circuit of claim 14, wherein the mixer is a first mixer, the circuit further comprising second and third mixers configured to mix a received signal with the corrected I and Q signals to generate reduced frequency I and Q signals upon which the I and Q baseband signals are based.

18. A method comprising:
receiving a calibration signal;
generating in-phase (I) and quadrature (Q) baseband signals from the calibration signal;
generating a phase adjustment signal indicating a phase error between the I and Q baseband signals and a polarity signal indicating a polarity of the phase error;
generating I and Q oscillator signals from a local oscillator signal;
correcting a phase error between the I and Q oscillator signals using the phase adjustment and polarity signals to generate phase-corrected I and Q oscillator signals; and
mixing the phase-corrected I and Q oscillator signals with the calibration signal to generate the I and Q baseband signals having a reduced phase error.

19. The method of claim 18, wherein generating the I and Q oscillator signals includes filtering the local oscillator signal to remove a harmonic of the local oscillator signal and to pass a fundamental frequency of the local oscillator signal.

20. The method of claim 18, wherein generating the phase adjustment and polarity signals includes:
mixing the I and Q baseband signals to generate a first signal including a direct current (DC) component;
detecting from the DC component the polarity of the phase error between the I and Q baseband signals, and responsively generating a second signal indicating the polarity of the phase error; and
generating the phase adjustment and polarity signals using the second signal.

* * * * *